US011449536B2

(12) United States Patent
Chang et al.

(10) Patent No.: US 11,449,536 B2
(45) Date of Patent: Sep. 20, 2022

(54) GENERATING ELECTRONIC SUMMARY DOCUMENTS FOR LANDING PAGES

(71) Applicant: Microsoft Technology Licensing, LLC, Redmond, WA (US)

(72) Inventors: Keng-hao Chang, San Jose, CA (US); Ruofei Zhang, Mountain View, CA (US); John Weston Hughes, Berkeley, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/414,337

(22) Filed: May 16, 2019

(65) Prior Publication Data

US 2020/0364252 A1 Nov. 19, 2020

(51) Int. Cl.
*G06F 16/34* (2019.01)
*G06F 16/33* (2019.01)
*G06N 3/08* (2006.01)

(52) U.S. Cl.
CPC ........ *G06F 16/345* (2019.01); *G06F 16/3347* (2019.01); *G06N 3/08* (2013.01)

(58) Field of Classification Search
CPC ...... G06F 16/345; G06F 16/3347; G06N 3/08
USPC ......................................................... 715/254
See application file for complete search history.

(56) References Cited

U.S. PATENT DOCUMENTS

| 10,229,111 B1* | 3/2019 | Filippova | G06F 40/30 |
| 2006/0161542 A1* | 7/2006 | Cucerzan | G06F 16/345 |
| 2012/0143595 A1* | 6/2012 | Li | G06F 16/345 |
| | | | 704/9 |
| 2016/0239490 A1* | 8/2016 | Dhamdhere | G06F 16/3338 |
| 2017/0124447 A1* | 5/2017 | Chang | G06F 16/3334 |
| 2018/0253780 A1* | 9/2018 | Wang | H04L 51/02 |
| 2018/0293313 A1* | 10/2018 | Hauptmann | G06F 16/71 |
| 2019/0042551 A1 | 2/2019 | Hwang | |
| 2019/0130273 A1* | 5/2019 | Keskar | G06F 40/58 |
| 2019/0392487 A1* | 12/2019 | Duke | G06N 20/00 |

FOREIGN PATENT DOCUMENTS

EP 3346397 A1 7/2018

OTHER PUBLICATIONS

Bartz, et al., "Natural language generation for sponsored-search advertisements", In Proceedings of the 9th ACM Conference on Electronic Commerce, Jul. 8, 2008, pp. 1-9.

(Continued)

*Primary Examiner* — Hope C Sheffield
(74) *Attorney, Agent, or Firm* — Calfee, Halter & Griswold LLP

(57) ABSTRACT

Described herein are technologies related to constructing supplemental content items that summarize electronic landing pages. A sequence to sequence model that is configured to construct supplemental content items is trained based upon a corpus of electronic landing pages and supplemental content items that have been constructed by domain experts, wherein each landing page has a respective supplemental content item assigned thereto. The sequence to sequence model is additionally trained using self critical sequence training, where estimated click through rates of supplemental content items generated by the sequence to sequence model are employed to train the sequence to sequence model.

20 Claims, 10 Drawing Sheets

(56) References Cited

OTHER PUBLICATIONS

Bombarelli, et al., "Automatic chemical design using a data-driven continuous representation of molecules", In the Journal of ACS central science, vol. 4, Issue 2, Dec. 5, 2017, 26 Pages.

Devlin, et al., "Language models for image captioning: The quirks and what works", In Proceedings of the 53rd Annual Meeting of the Association for Computational Linguistics and the 7th International Joint Conference on Natural Language Processing, Jan. 2015, pp. 100-105.

Fain, et al., "Sponsored Search: a Brief History", In Bulletin of the American Society for Information Science and Technology, vol. 32, Issue 2, Dec. 2006, 03 Pages.

Fujita, et al., "Automatic Generation of Listing Ads by Reusing Promotional Texts", In the Proceedings of the 12th International Conference on Electronic Commerce: Roadmap for the Future of Electronic Business, Aug. 2, 2010, pp. 179-188.

Gatys, et al., "Image style transfer using convolutional neural networks", In Proceedings of the IEEE Conference on Computer Vision and Pattern Recognition, Jun. 27, 2016, pp. 2414-2423.

Gulcehre, et al., "Pointing the unknown words", In Journal of The Computing Research Repository, Mar. 2016, 10 Pages.

Hidasi, et al., "Parallel recurrent neural network architectures for feature-rich session-based recommendations", In Proceedings of the 10th ACM Conference on Recommender Systems, Sep. 15, 2016, 8 Pages.

Kingma, et al., "Adam: A method for stochastic optimization", In the Proceedings of conference paper at the 3rd International Conference for Learning Representations, Dec. 22, 2014, 15 Pages.

Kryscinski, et al., "Improving abstraction in text summarization", In the Journal of Computation and Language, Aug. 23, 2018, 10 Pages.

Wu, et al., "Google's neural machine translation system: Bridging the gap between human and machine translation", In Publication of arXiv preprint arXiv:1609.08144, Sep. 26, 2016, pp. 1-23.

Lin, Chin Yew., "Rouge: A package for automatic evaluation of summaries", In the Journal of Text Summarization Branches Out, 2004, 8 Pages.

Ling, et al., "Model ensemble for click prediction in bing search ads", In Proceedings of the 26th International Conference on World Wide Web Companion, Apr. 3, 2017, pp. 689-698.

Luong, et al., "Effective approaches to attention-based neural machine translation", In Journal of The Computing Research Repository, Aug. 2015, 10 Pages.

Nallapati, et al., "Summarunner: A recurrent neural network based sequence model for extractive summarization of documents", In the Journal of The Computing Research Repository, Nov. 14, 2016, 7 Pages.

Pasunuru, et al., "Multi-reward reinforced summarization with saliency and entailment", In the Journal of The Computing Research Repository, Apr. 2018, 9 Pages.

Paulus, et al., "A deep reinforced model for abstractive summarization", In Journal of Computing Research Repository, May 2017, pp. 1-12.

Rennie, et al., "Self-critical sequence training for image captioning", In Proceedings of the IEEE Conference on Computer Vision and Pattern Recognition, Jul. 2017, 16 pages.

Richardson, et al., "Predicting Clicks: Estimating the Click-Through Rate for New Ads", In Proceedings of the 16th International Conference on World Wide Web, May 8, 2007, pp. 521-529.

Rush, et al., "A Neural Attention Model for Abstractive Sentence Summarization", In Proceedings of the Conference on Empirical Methods in Natural Language Processing, Sep. 17, 2015, pp. 379-389.

Sankaran, et al., "Temporal attention model for neural machine translation", In arxiv Repository, suparXiv:1608.02927v1, Aug. 9, 2016, 10 Pages.

See, et al., "Get to the point: Summarization with pointer-generator networks", In Proceedings of the 55th Annual Meeting of the Association for Computational Linguistics, Jul. 30, 2017, 20 Pages.

Sutskever, et al., "Sequence to sequence learning with neural networks", In Journal of Advances in neural information processing systems, Dec. 8, 2014, pp. 1-9.

Williams, Ronald J.., "Simple statistical gradient-following algorithms for connectionist reinforcement learning", In Journal of Machine Learning, vol. 8, Issue 3-4, May 1992, pp. 229-256.

Thomaidou, Stamatina, "Automated Creation and Optimization of Online Advertising Campaigns", In the Thesis on Automated Creation and Optimization of Online Advertising Campaigns, Oct. 2014, 151 Pages.

Thomaidou, et al., "Automated Snippet Generation for Online Advertising", In Proceedings of the 22nd ACM International conference on Information & Knowledge Management,, Oct. 27, 2013, pp. 1841 1844.

Chopra, et al., "Abstractive Sentence Summarization with Attentive Recurrent Neural Networks", In Proceedings of the Conference of the North American Chapter of the Association for Computational Linguistics: Human Language Technologies, Jun. 12, 2016, pp. 93-98.

Khatri, et al., "Absliactive and Extractive Text Summarization using Document Context Vector and Recurrent Neural Networks", In Repository of arxiv:1807.08000v1, Jul. 20, 2018, 9 Pages.

"International Search Report & Written Opinion issued in PCT Application No. PCT/US20/023233", dated Jul. 1, 2020, 10 Pages.

Shi, et al., "Neural Abstractive Text Summarization with Sequence-to-Sequence Models", In Repository of arXiv:1812.02303v1, Dec. 5, 2018, 29 Pages.

* cited by examiner

GENERATING ELECTRONIC SUMMARY DOCUMENTS FOR LANDING PAGES

BACKGROUND

Search engines are generally configured to provide search results to users who submit queries to the search engines. Search engines derive a significant portion of their revenue from displaying supplemental content items (such as text advertisements) together with search results on search engine results pages (SERPs). Typically, a search engine receives revenue from an owner of a supplemental content item when the supplemental content item is clicked by an end user who submitted a query to the search engine.

A supplemental content item may include a selectable hyperlink, such that a web browser loads a landing page when the supplemental content item is selected, wherein the landing page corresponds to the supplemental content item. For instance, the landing page may be a page where a product can be purchased on a website. Many domains include thousands of different landing pages, wherein each landing page may correspond to a product or service that can be purchased by way of the landing page. Conventionally, supplemental content items that correspond to landing pages are generated manually or through use of templates. With respect to manual generation of supplemental content items, it is expensive to manually generate supplemental content items for domains that include a large number of landing pages, particularly when the landing pages are subject to change. With respect to use of templates to generate supplemental content items, when a supplemental content item is generated through use of a template, the resultant supplemental content item may be insufficiently descriptive of the content of the landing page, may include text that is semantically incorrect, and/or may include text that is syntactically incorrect.

SUMMARY

The following is a brief summary of subject matter that is described in greater detail herein. This summary is not intended to be limiting as to the scope of the claims.

Described herein are various technologies that facilitate constructing a supplemental content item for a landing page, wherein the supplemental content item is configured to appear to an end user as if the supplemental content item were constructed manually by a human, and is further constructed such that there is a relatively high likelihood that an end user will select the supplemental content item if presented to the end user. In an example, the supplemental content item can be an electronic text advertisement that, when selected, causes a web browser to load the landing page, wherein the landing page is a web page that corresponds to the electronic text advertisement.

In more detail, a landing page can include a title and a body, wherein the title of the landing page includes a first sequence of words and the body of the landing page includes a second sequence of words. A computer-implemented model generates a supplemental content item for the landing page based upon the first sequence of words and the second sequence of words. The supplemental content item includes a title and a body, wherein the title of the supplemental content item includes a third sequence of words and the body of the supplemental content item includes a fourth sequence of words. The computer-implemented model constructs the title of the supplemental content item based upon both the title and the body of the landing page. Additionally, the computer-implemented model constructs the body of the supplemental content item based upon both the title and the body of the landing page. The computer-implemented model is trained based upon landing page/supplemental content item pairs, wherein the supplemental content items used to train the computer-implemented model are manually generated by domain experts. Thus, the computer-implemented model is configured to output supplemental content items that appear to end users as if the supplemental content items were generated by domain experts. Moreover, the computer-implemented model is additionally trained based upon estimated likelihoods of supplemental content items being selected by end users if a search engine were to receive, from the end users, queries that include one or more keywords that are assigned to the supplemental content items. Put differently, the computer-implemented model is trained to output supplemental content items such that the supplemental content items have a relatively high click through rate (CTR) corresponding thereto.

In an exemplary embodiment, the computer-implemented model is a sequence to sequence model that comprises an encoder and a decoder, wherein the encoder is configured to encode the title and the body of the landing page in parallel, and the decoder is configured to decode the title and body of the supplemental content item in parallel. The encoder can include a first encoder recurrent neural network (RNN) and a second encoder RNN, wherein the first encoder RNN is configured to encode the title of the landing page and the second encoder RNN is configured to encode the body of the landing page. Hidden states of the RNNs of the encoder are concatenated and provided as input to the decoder. The decoder of the sequence to sequence model includes first and second decoder RNNs, wherein the first decoder RNN is configured to construct the supplemental content item title based upon the concatenated hidden states of the encoder RNNs, and further wherein the second decoder RNN is configured to construct the body of the supplemental content item based upon the concatenated hidden states of the encoder RNNs. The computer-implemented model can construct supplemental content items for numerous landing pages, wherein each of the supplemental content items constructed by the computer-implemented model can appear to end users as if they were manually constructed by domain experts, and is also constructed to have relatively high CTRs associated therewith.

The above-described computer-implemented model can be trained in two stages. In a first training stage, the computer-implemented model can be trained based upon landing page/supplemental content item pairs, wherein each pair includes a landing page and a supplemental content item generated for the landing page by a domain expert. Hence, in the first training stage, the computer-implemented model is trained to output supplemental content items based upon landing pages to mimic how domain experts manually generate supplemental content items based upon corresponding landing pages. In the second training stage, self-critical sequence training can be employed, wherein the computer-implemented model is trained to consider estimated CTRs of supplemental content items output by the computer-implemented model. For example, the computer-implemented model may be a probabilistic model that can be configured to construct a first supplemental content item for a landing page, wherein the first supplemental content item for the landing page has a highest computed probability. In addition, sampling can be performed over the computer-implemented model, such that the computer-implemented model constructs a second supplemental content item for the landing page, wherein the second supplemental content item has a lower computed probability than the computed probability for the first supplemental content item. Subsequently, a CTR estimator model that is configured to estimate CTRs can be provided with the first supplemental content item and the second supplemental content item, and the CTR estimator model can output a first estimated CTR for the first supplemental content item and a second estimated CTR for the second supplemental content item. In the self-critical sequence training stage, the computer-implemented model can be trained to "move toward" the supplemental content item with the higher estimated CTR.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
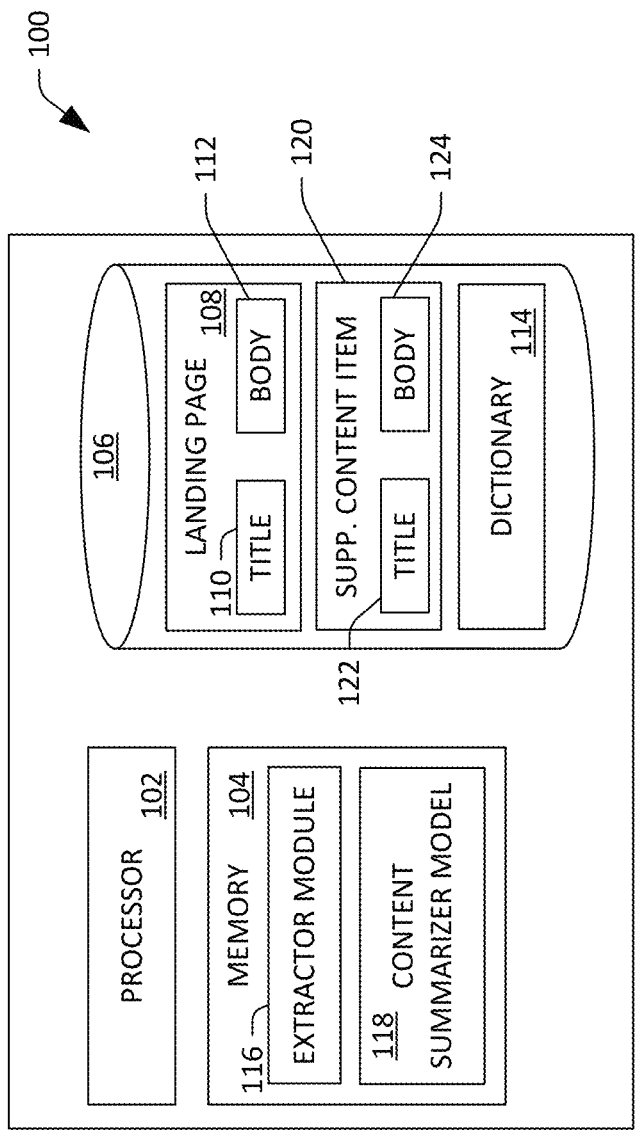
FIG. 1 is a functional block diagram of an exemplary computing system that is configured to construct supplemental content items that include a title and a body.

Various technologies pertaining to constructing supplemental content items for landing pages are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", "model", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to constructing a supplemental content item for a landing page, wherein the supplemental content item is constructed such that it appears to an end user as if it were generated manually by a domain expert, and is also constructed to have a relatively high probability of selection by the end user when the end user submits a query to a search engine that comprises a keyword that is assigned to the landing page. The technologies described herein are particularly well-suited for constructing supplemental content items for websites that have a large number of landing pages. Utilizing the technologies described herein, supplemental content items for landing pages of the website can be machine-constructed while nevertheless appearing to end users as if the supplemental content items were manually generated by domain experts. As will be described in greater detail below, a computer-implemented model is configured to construct the supplemental content items based upon text from landing pages. The computer-implemented model is trained using landing page/supplemental content item pairs, wherein the supplemental content items in the pairs were manually constructed by domain experts. In addition, the computer-implemented model is trained to consider probabilities that supplemental content items will be selected by end users when presented on search engine results pages (SERPs).

With reference now to FIG. 1, a functional block diagram of an exemplary computing system 100 is illustrated, wherein the computing system 100 is configured to construct a supplemental content item for a landing page. A landing page is an electronic page, such as a web page, where traffic is desirably directed. For instance, the landing page can be a page where a product or service can be purchased by way of the page. A landing page comprises a title and a body, wherein the title and body include text. A supplemental content item is an electronic item that can be linked to a landing page and may be configured to direct traffic to the landing page. For instance, the supplemental content item can be a text advertisement for the product or service that can be purchased by way of the landing page. A supplemental content item includes a title and a body, wherein the title and body include text.

The computing system 100 comprises a processor 102 and memory 104, wherein the memory 104 includes instructions that are executed by the processor 102. The computing system 100 also includes a data store 106, wherein the data store 106 stores content that is accessible to the processor 102. In the exemplary system 100, the data store 106 includes a landing page 108. As indicated previously, the landing page 108 may be a webpage that belongs to a website, wherein a product or service can be purchased by way of the webpage. In another example, the landing page 108 may be an electronic page of a computer-executable application, such as a mobile application that can be used to purchase goods and/or services.

The landing page 108 includes text. More specifically, the landing page 108 includes a title 110 and a body 112. The title 110 and body 112 can be delineated in the landing page 108 by respective HTML tags. The title 110 includes a first sequence of words and the body 112 includes a second sequence of words. In an example, a number of words in the title 110 of the landing page 108 can be beneath a first predefined threshold (e.g., 20 words) and a number of words in the body 112 of the landing page 108 can be beneath a second predefined threshold (e.g., 2000).

The data store 106 further includes a dictionary 114 that comprises words that may be included in supplemental content items constructed by the computing system 100. Accordingly, as will be described in greater detail below, a supplemental content item generated based upon the landing page 108 is not limited to including text only from the title 110 and/or body 112 of the landing page 108, but rather may include words that are included in the dictionary 114.

The memory 104 includes an extractor module 116 that is configured to receive the landing page 108 and extract the title 110 and the body 112 from the landing page 108. For example, the extractor module 116 can receive an indication that a supplemental content item is to be generated for the landing page 108, and responsive to receiving such indication can extract the first sequence of words in the title 110 of the landing page 108 and can extract the second sequence of words in the body 112 of the landing page 108.

The memory 104 also includes a computer-implemented content summarizer model 118. Briefly, the content summarizer model 118 is configured to receive the first sequence of words and the second sequence of words extracted from the title 110 and the body 112, respectively, of the landing page 108 from the extractor module 116, and is further configured to construct a supplemental content item 120 for the landing page 108 and cause the supplemental content item 120 to be stored in the data store 106. The supplemental content item 120 can have a predefined format; for example, the supplemental content item 120 can include a title 122 and a body 124, wherein the title 122 is to include a number of words within a first range (e.g., 1 to 15 words), and the body 124 is to include a number of words within a second range (e.g., 5 to 30 words).

As referenced previously, the content summarizer model 118 receives the first sequence of words and the second sequence of words extracted by the extractor module 116 from the title 110 and the body 112 of the landing page 108, and constructs the supplemental content item 120 based upon the first sequence of words, the second sequence of words, and the dictionary 114. The supplemental content item 120 includes the title 122 and the body 124, wherein the title 122 includes a third sequence of words and the body 124 includes a fourth sequence of words. The content summarizer model 118, as will be described in greater detail below, can construct the title 122 of the supplemental content item 120 based upon both the title 110 and the body 112 of the landing page 108, and can further construct the body 124 of the supplemental content item 120 based upon both the title 110 and the body 112 of the landing page 108.

The content summarizer model 118 can include a sequence to sequence model, wherein the sequence to sequence model includes an encoder and a decoder. The sequence to sequence model is configured to encode, in parallel, the title 110 and the body 112 of the landing page 108, and is further configured to construct, in parallel, the title 122 and the body 124 of the supplemental content item 120. The content summarizer model 118 is trained using landing page/supplemental content item pairs, wherein each pair includes a landing page and a supplemental content item generated for the landing page by a domain expert. Hence, the supplemental content item 120 constructed for the landing page 108 by the content summarizer model 118 appears to an end user as if the supplemental content item 120 were constructed by a domain expert. Moreover, the content summarizer model 118 is additionally trained to consider the likelihood of supplemental content items being selected when presented on SERPs. Therefore, the supplemental content item 120 constructed by the content summarizer model 118 can have a relatively high likelihood of being selected by an end user when the end user submits, to a search engine, a query that comprises a keyword that is assigned to the landing page 108.

In an exemplary embodiment, the supplemental content item 120 can be an in-line advertisement that is presented concurrently with search results by a search engine in response to the search engine receiving a query from an end user. Accordingly, the supplemental content item 120 can include a hyperlink that, when selected by the end user, causes a browser to load the landing page 108. In another exemplary embodiment, the supplemental content item 120 can be a summarization of a web page that is referenced in a search result.

Figure 2:
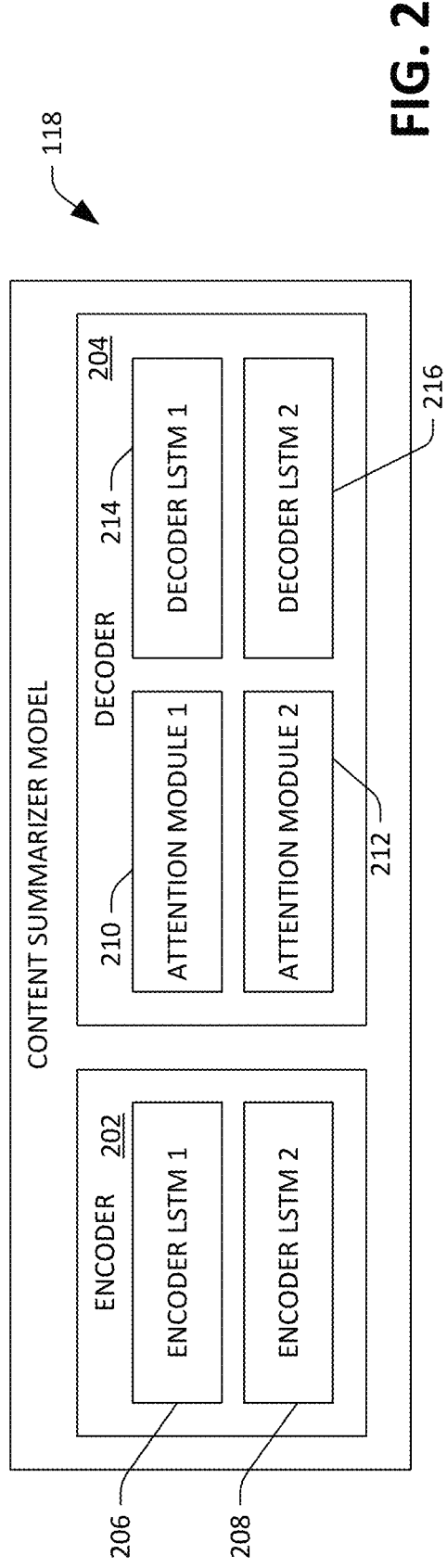
FIG. 2 is a functional block diagram of an exemplary content summarizer module.

Referring now to FIG. 2, a functional block diagram of the content summarizer module model 118 is illustrated. The content summarizer model 118 includes an encoder 202 and a decoder 204, wherein the encoder 202 is configured to encode the title 110 and the body 112 of the landing page 108 in parallel, and the decoder 204 is configured to construct the title 122 and the body 124 of the supplemental content item 120 in parallel. The encoder 202 includes k recurrent neural networks (RNNs); in the example illustrated in FIG. 2, the encoder includes two RNNs. More specifically, the encoder 202 can include a first encoder long short-term memory RNN (LSTM) 206 and a second encoder LSTM 208. The first and second encoder LSTMs 206 and 208 are bidirectional LSTMs. It is to be understood that the encoder 202 can include more than two LSTMs, wherein a number of LSTMs in the encoder 202 can be commensurate with a number of different portions of text to be encoded. The first encoder LSTM 206 is configured to receive first input that is based upon the title 110 of the landing page 108 and the second encoder LSTM 208 is configured to receive second input that is based upon the body 112 of the landing page 108. The encoder LSTMs 206 and 208 have hidden states, and the last of the hidden states of the LSTMs 206 and 208 are concatenated into a latent vector and used to initialize the decoder 204.

The decoder 204 includes a first attention model 210 that attends over hidden state sequences of the first encoder LSTM 206 and further includes a second attention model 212 that attends over hidden state sequences of the second encoder LSTM 208. A number of attention modules in the decoder 204 can be equivalent to a number of encoder LSTMs in the encoder 202. The decoder 204 additionally comprises/RNNs; in the example illustrated in FIG. 2, the decoder 204 comprises a first decoder LSTM 214 and a second decoder LSTM 216. The decoder LSTMs 214 and 216 are initialized with the concatenated hidden states of the first and second encoder LSTMs 206 and 208, respectively. The first decoder LSTM 214 is configured to construct the title 122 of the supplemental content item 120 and the second decoder LSTM 216 is configured to construct the body 124 of the supplemental content item 120.

Figure 3:
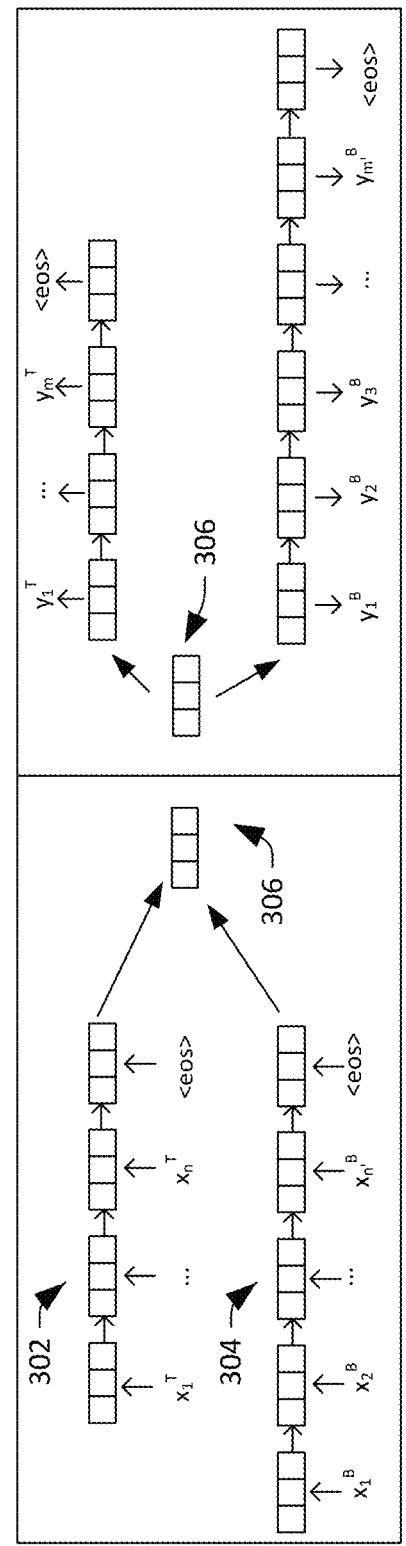
FIG. 3 is a schematic that illustrates exemplary operation of the content summarizer model depicted in FIG. 2.

Referring to FIG. 3, an exemplary schematic 300 depicting operation of the content summarizer model 118 is set forth. The landing page 108 ($x$) can be described as including the multiword title 110 and the multiword body 112:

$$x = x_1^T, \ldots, x_n^T, x_1^B, \ldots, x_n^B. \tag{1}$$

The supplemental content item 120 ($y$) can be described as including the multiword title 122 and the multiword body 124:

$$y = y_1^T, \ldots, y_m^T, y_1^B, \ldots, y_{m'}^B. \tag{2}$$

As illustrated in FIG. 3, the encoder 202 is configured to map each word $x_1^T, \ldots, x_n^T, x_1^B, \ldots, x_n^B$, in the title 110 of the landing page 108 and the body 112 of the landing page 108, respectively, to one hot encoded vectors. The encoder 202 can then multiply each of the one hot encoded vectors by an embedding matrix $W_{emb}$, resulting in a first sequence of vectors $e_1^T, \ldots e_n^T$ (represented by reference numeral 302) and a second sequence of vectors $e_1^B, \ldots e_n^B$ (represented by reference numeral 304). The first encoder LSTM 206 receives the first sequence 302 and the second encoder LSTM 208 receives the second sequence 304, wherein the first encoder LSTM 206 has hidden states $h_i^{x^T} = [h_{f,i}^{x^T} \| h_{b,i}^{x^T}]$, and the second encoder LSTM 208 has hidden states $h_i^{x^B} = [h_{f,i}^{x^B} \| h_{b,i}^{x^B}]$, where f,i and b,i are hidden vectors of forward and backward LSTMs, respectively. The encoder 202 concatenates the last hidden states of the encoder LSTMs 206 and 208 into a latent vector s (represented by reference numeral 306). The decoder 204 constructs the title 122 $y_1^T, \ldots, y_m^T$ and the body 124 $y_1^B, \ldots, y_{m'}^B$, of the supplemental content item 120 through use of the decoder LSTMs 214 and 216, both initialized with state s and attending over both input hidden state sequences of the encoder LSTMs 206 and 208.

As noted above, the decoder 204 includes attention modules 210 and 212. In an example, the attention modules 210 and 212 can be Luong attention modules with intra-attention scaling. Each of the decoder LSTMs $D \in \{y^T, y^B\}$ (decoder LSTMs 214 and 216) attends over each of the encoder LSTMs $E \in \{x^T, x^B\}$ (encoder LSTMs 206 and 208). At each time step i in each of the decoder LSTMs D, and for each time step j in each of the encoder LSTMs E, the decoder 204 calculates attention scores $$e_{t,j}^E = h_t^{D^T} h_j^E.$$

The decoder 204 normalizes these scores using past attentional scores, resulting in the following normalized scores:

$$e_{t,j}^{E'} = \begin{cases} \exp(e_{t,j}^E) & t = 1 \\ \dfrac{\exp(e_{t,j}^E)}{\sum_{s=1}^{t-1} \exp(e_{s,j}^E)} & t > 1 \end{cases} \tag{3}$$

It can be noted that in the denominator of Eq. (3), past decoder steps are summed over, meaning that if in past steps a large part of the attention distribution was placed on a specific encoder step, in future steps this will be down-weighted, thus reducing the likelihood that the model will repeat itself.

The decoder 204 next normalizes across encoder steps as follows:

$$\alpha_{t,j}^E = \frac{e_{t,j}^{E'}}{\sum_{i=1}^{len(E)} e_{t,i}^{E'}}. \tag{4}$$

These $\alpha$'s serve both as a distribution over input words to copy from, and as weights for calculating the following context vector:

$$c_{t,j}^E = \sum_{i=1}^{len(E)} \alpha_{t,i}^E \cdot h_i^E. \tag{5}$$

For each decoder LSTM D, and at each decoder time step i, the decoder LSTM outputs a hidden state $h_i^D$, attention distributions $\alpha_{i,j}^{x^T}, \alpha_{i,j}^{x^B}$, and context vectors $c_t^{x^T}, c_t^{x^B}$. From such outputs, the decoder 204 predicts two distributions over potential output words, $p_{vocab}$ and $p_{copy}$. The decoder 204 can either predict a word using a softmax method or point to a token in either of the input strings $x_1^T, \ldots, x_n^T$, $x_1^B, \ldots, x_n^B$ to copy as its output. From $o_t^D = [h_i^D \| c_t^{x^T} \| c_t^{x^B}]$, a distribution over the vocabulary in the dictionary 114 can be constructed:

$$P_{vocab} = (y_t^D) = p(y_t^D | u_t^D = 0) = \text{softmax}(W_{out}^D o_t^D). \tag{6}$$

Additionally, a distribution over the tokens in each input string can be calculated:

$$P_{copy\ from\ T}(y_i^D) = p(y_i^D = x_j^{x^T} | u_t^D = 1) = \alpha_{i,j}^{x^T}$$

$$P_{copy\ from\ B}(y_i^D) = p(y_i^D = x_j^{x^B} | u_t^D = 2) = \alpha_{i,j}^{x^B} \tag{7}$$

(e.g., the attention distribution over each of the encoder LSTMs 206 and 208). The decoder 204 can also predict a three-way switch variable:

$$p(u_T^D) = \text{softmax}(W_u^D o_t^D + b_u^D) \tag{8}$$

The decoder 204 chooses the final output at each step from the following distribution:

$$p(y_t^D) = p(y_t^D | u_t^D = 0) p(u_t^D = 0) + p(y_t^D | u_t^D = 1) p(u_t^D = 1) + p(y_t^D | u_t^D = 2) p(u_t^D = 2) \tag{9}$$

Thus, the content summarizer model 118 can interleave words from the large vocabulary of the dictionary 114 and words copied from input text (text in the title 110 and/or the body 112 of the landing page 108).

Further, $$W_{out} = \tan h(W_{emb} W_p), \tag{10}$$

thereby allowing semantic relationships learned in the embedding matrix to be used in the output matrix. In total, the content summarizer model 118 learns the parameters for all four LSTMs 206, 208, 214, and 216, the embedding matrices $W_{emb}, W_p$, and the switch parameters for each decoder LSTM 214 and 216 $b_u^D, W_u^D$.

Figure 4:
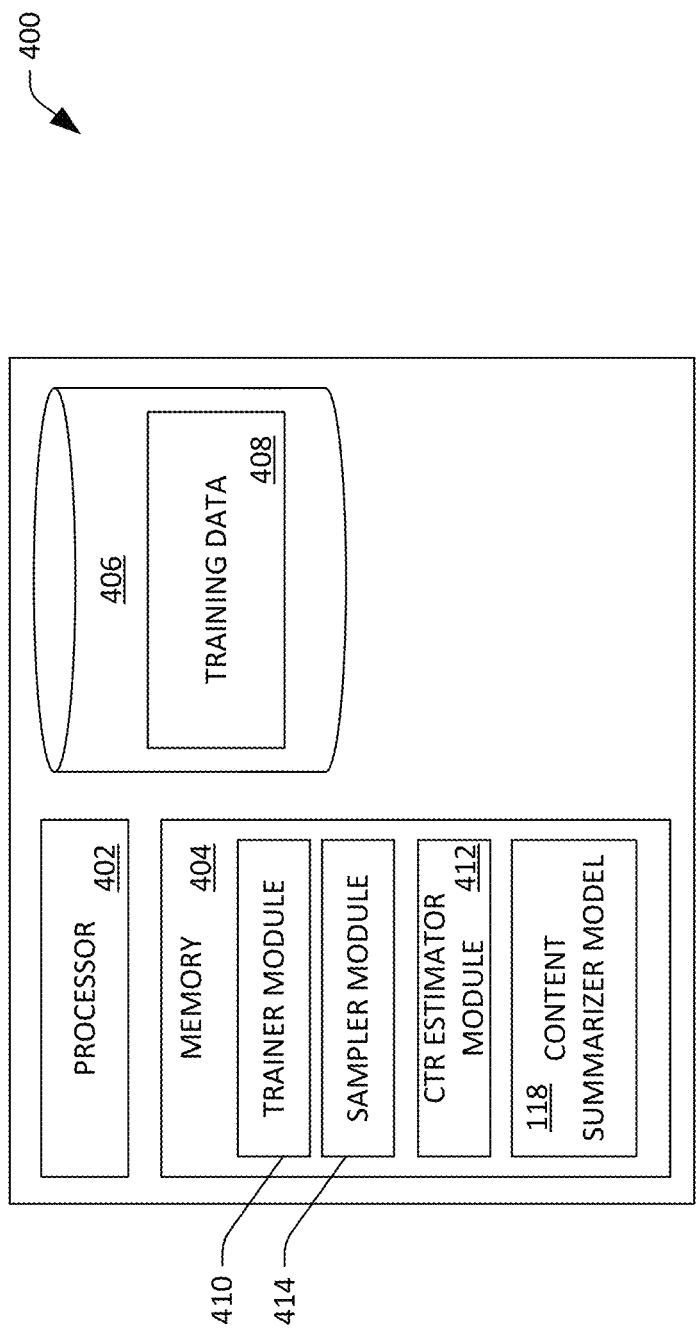
FIG. 4 is a functional block diagram of an exemplary computing system that is configured to train the content summarizer model.

With reference now to FIG. 4, a functional block diagram of an exemplary computing system 400 that is configured to train the content summarizer model 118 is illustrated. The computing system 400 includes a processor 402 and memory 404, wherein the memory 404 includes instructions that are executed by the processor 402. The computing system 400 additionally includes a data store 406 that has training data 408 stored therein, wherein the training data 408 comprises a preexisting corpus of landing pages x* and supplemental content items y*, where each supplemental content item in y* was constructed by a (human) domain expert for a respective landing page in x*.

The memory 404 includes a trainer module 410 that is configured to train the content summarizer model 118 in two stages. In the first stage of training, the goal of the trainer module 410 is to train the content summarizer model 118 such that the content summarizer model 118 semantically imitates the landing page/supplemental content item pairs in the training data 408. Hence, the aim of the trainer module 410 is to find a joint distribution $p_\theta$ that maximizes the likelihood of the supplemental content items y* in the training data, or minimizes the following:

$$L_{XE} = -\Sigma_{x,y \in x^*, y^*} \Sigma_{i=1}^{m+m'} \log p_\theta(y_i|y_{1:i-1},x). \quad (11)$$

Thus, in the first training stage, the trainer module 410 minimizes the perplexity of the text of the supplemental content item conditioned on the text of the landing page. Ideally, $p_\theta$ would capture both a quality language model for a supplemental content item and also learn to extract salient information from the landing page.

The memory 404 also includes a click through rate (CTR) estimator module 414 that is employed in the second stage of training. The CTR estimator module 414 is configured to receive a supplemental content item and estimate a CTR for the supplemental content item (presuming that an end user set forth, to a search engine, a query that includes a keyword that is assigned to the supplemental content item). In the second stage of training of the content summarizer model 118, the trainer module 410 trains the content summarizer model 118 with the goal of increasing the click through rate (CTR) of supplemental content items output by the content summarizer model 118; equivalently, the trainer module 410 trains the content summarizer model 118 with the goal of minimizing the following:

$$L_{CTR} = -\Sigma_{x \in x^*} \mathbb{E}_{\hat{y} \sim p_\theta(\cdot|x)} CTR(\hat{y}), \quad (12)$$

where CTR(y) is the click through rate of a supplemental content item y as predicted by the CTR estimator module 412. This prediction can also be parameterized by the query leading to the display of the supplemental content item, keywords defined by an owner of the supplemental content item, location of the supplemental content item on a page (e.g., a search engine results page), and a uniform resource locator (URL) displayed in the supplementary content item, all of which are abstracted away in equations for simplicity.

The memory 404 further includes a sampler module 414 that is configured to sample from the content summarizer model 118 after the trainer module 410 has completed the first training stage. The sampler module 414, by sampling different outputs of the content summarizer model 118, is able to cause the content summarizer model 118 to output different supplemental content items for the same input (the same landing page). The trainer module 410 can train the content summarizer model 118 based upon the different supplemental content items output by the content summarizer model 118. Operation of the trainer module 410, the sampler module 414, the content summarizer model 118, and the CTR estimator module 412 is now set forth in greater detail.

The trainer module 410 and the sampler module 414 can operate in conjunction during the second stage of training the content summarizer model 118, wherein the trainer module 410 can employ Self Critical Sequence Training. When the content summarizer model 118 is provided with a landing page, a supplemental content item $\bar{y}$ is the most likely output, while a supplemental content item $\hat{y}$ can be output when the decoder LSTMs 214 and 216 are sampled. Using such supplemental content items, the trainer module 410 can compute the gradient of $L_{CTR}$ with respect to $\theta$.

The gradient $$\nabla_\theta L_{CTR} = E_{\hat{y} \sim p_\theta(\cdot|x)}[CTR(\hat{y})\nabla_\theta \Sigma \log p_\theta(y_i|y_{1:i-1},x)] \quad (13)$$

can normally be estimated during gradient descent as $$\nabla_\theta L_{CTR} \approx CTR(\hat{y})\nabla_\theta \Sigma \log p_\theta(\hat{y}_i|y_{1:i-1},x) \quad (14)$$

for one $\hat{y}$ sampled from the decoder LSTMs 214 and 216 by the sampler module 414. In Self Critical Sequence Training, the algorithm to compute the aforementioned gradient can additionally be baseline by $r(\bar{y})$ for $\bar{y}$, the most likely value of $p_\theta$, thus comparing samples from the content summarizer model 118 against its own current test time (most probable) prediction. This does not change the expectation of the gradient, but in practice lowers the variance significantly. The trainer module 410 baselines this gradient by the arg-max of the decoder LSTMs 214 and 216:

$$\nabla_\theta L_{CTR}(CTR(\hat{y})-CTR(\bar{y}))\nabla_\theta \Sigma \log p_\theta(\hat{y}_i|\hat{y}_{1:i-1},x) \quad (15)$$

where $\hat{y}$ is the output of the decoder 204 arg-maxed at each step. Thus, when the CTR estimator module 412 estimates that the CTR for a sample is higher than the CTR for the most probable output of the content summarizer model 118, the trainer module 410 increases the probability of seeing that sample. Conversely, when the CTR estimator module 412 estimates that the CTR for the sample is lower than the CTR for the most probable output of the content summarizer model 118, the trainer module 410 decreases the probability of seeing that sample. This is illustrated in the schematic shown in FIG. 5.

To encapsulate both loss functions referenced above, the following loss function can be defined and employed by the trainer module 410 when training the content summarizer model 118:

$$L_{total} = \gamma K_{XE} + (1-\gamma)L_{CTR} \quad (16)$$

for some hyper parameter $\gamma \in (0,1)$.

Figure 5:
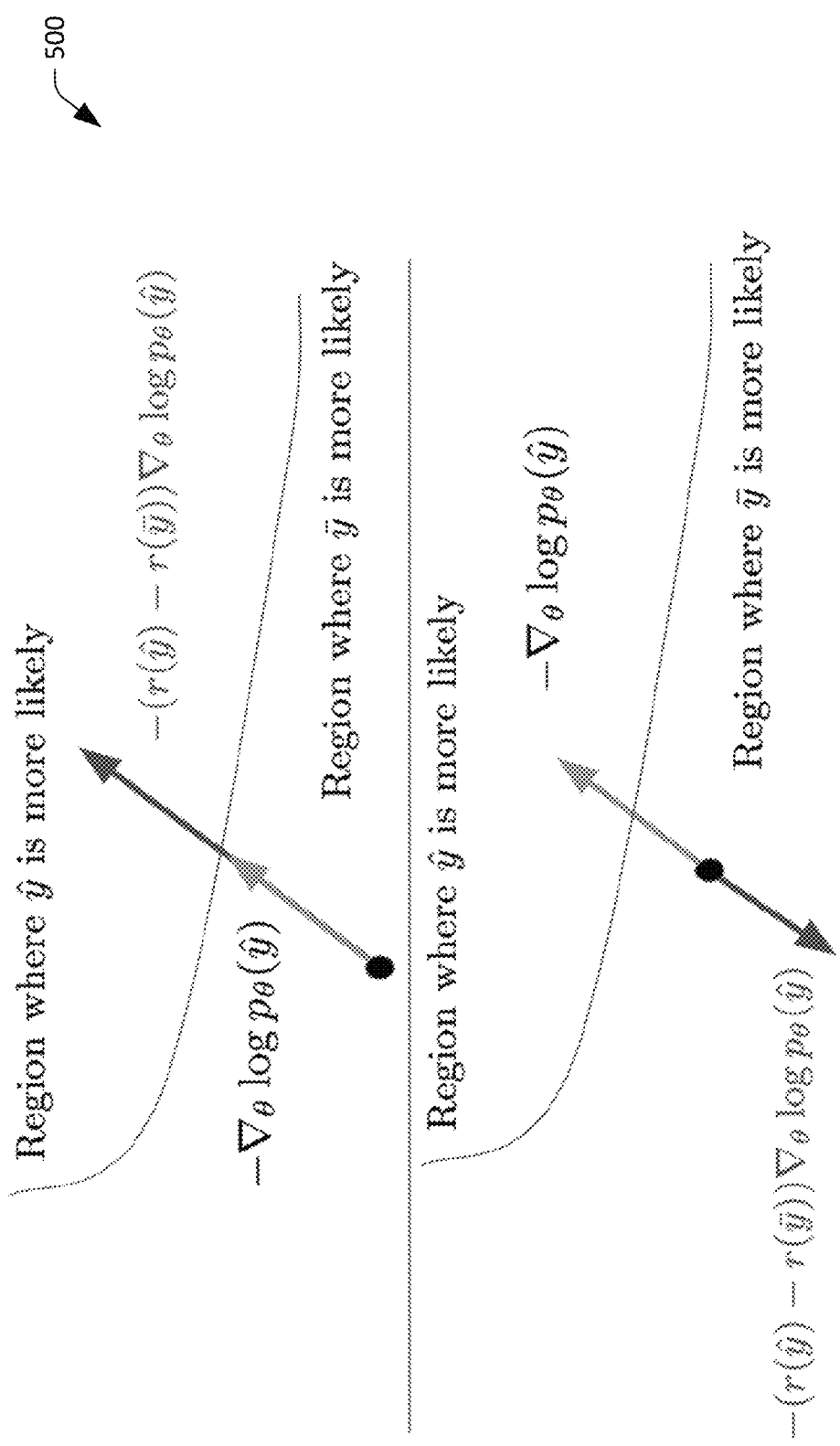
FIG. 5 is a schematic that depicts a self critical sequence training stage when training the content summarizer model.

Referring to FIG. 5, a schematic 500 is illustrated that depicts gradients towards and away from samples output by the content summarizer model 118. In Self-Critical Sequence Training, the gradient towards a new sample $\hat{y}$ is scaled by the increase in rewards (in CTR) seen if that sample is predicted instead of the content summarizer model's current most likely prediction $\bar{y}$. Thus, if equation $\bar{y}$ has a higher reward than $\bar{y}$ (as illustrated in the upper portion of FIG. 5), the probability of seeing $\hat{y}$ will increase while if the reward is lesser (as illustrated in the bottom portion of FIG. 5), the probability of seeing $\hat{y}$ will decrease.

Figure 6:
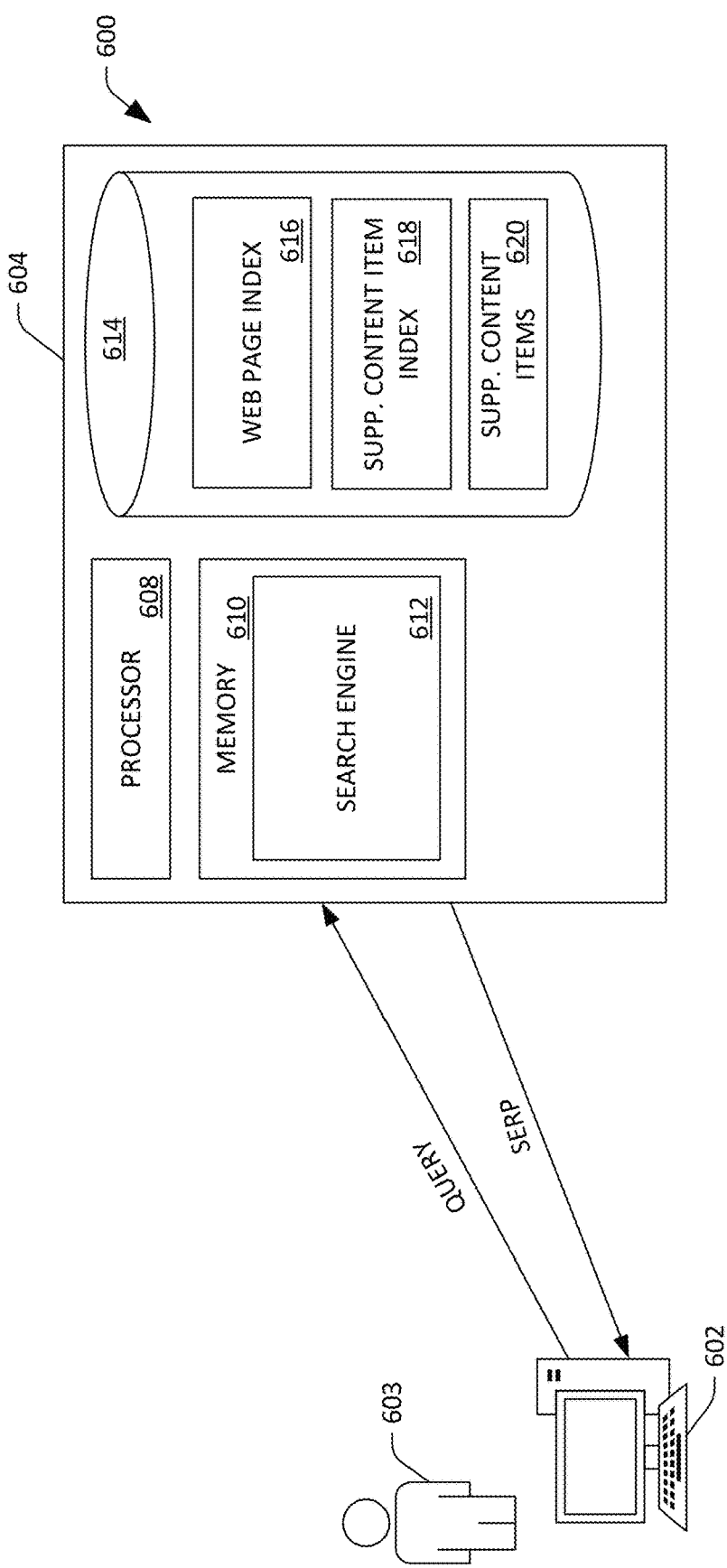
FIG. 6 is a functional block diagram of an exemplary computing system that is configured to cause a supplemental content item to be included in a search engine results page.

With reference now to FIG. 6, an exemplary system 600 that is configured to cause supplemental content items constructed by the content summarizer model 118 to be presented on a display of a client computing device is illustrated. The system 600 includes a client computing device 602 operated by an end user 603. The client computing device 602 may be any suitable computing device, including but not limited to a desktop computing device, a laptop computing device, a tablet computing device, a mobile telephone, a wearable computing device, a video game console, or the like. The system 600 also includes a computing system 604 that is in network communication with the client computing device 602. The computing system 604 comprises a processor 608 and memory 610, wherein the memory 610 includes a search engine 612 that is executed by the processor 608. The search engine 612 can be a general-purpose web search engine that is configured to receive queries from client computing devices and return search results to the client computing devices in response to receipt of the queries.

The computing system 604 also includes a data store 614. The data store 614 includes a webpage index 616, a supplemental content item index 618, and supplemental content items 620. In operation, the computing system 604 receives a query from the client computing device 602, whereupon the query is provided to the search engine 612. The search engine 612 searches the webpage index 616 and identifies and ranks a plurality of search results based upon the query. In addition, the query can include a keyword that is assigned to one or more supplemental content items. The search engine 612 can identify that the query includes the keyword and can further search the supplemental content item index 618 based upon the keyword. The search engine 612 can identify a supplemental content item based upon the search and retrieve the identified supplemental content item from the supplemental content items 620. The search engine 612 construct a SERP that includes the plurality of ranked search results and the supplemental content item. The search engine 612 causes the computing system 604 to transmit the SERP to the client computing device 602, whereupon the client computing device 602 presents the SERP on a display of the client computing device 602 for review by the end user 603. Hence, the SERP displayed at the client computing device 602 can include a supplemental content item generated by the content summarizer model 118.

Figure 7:
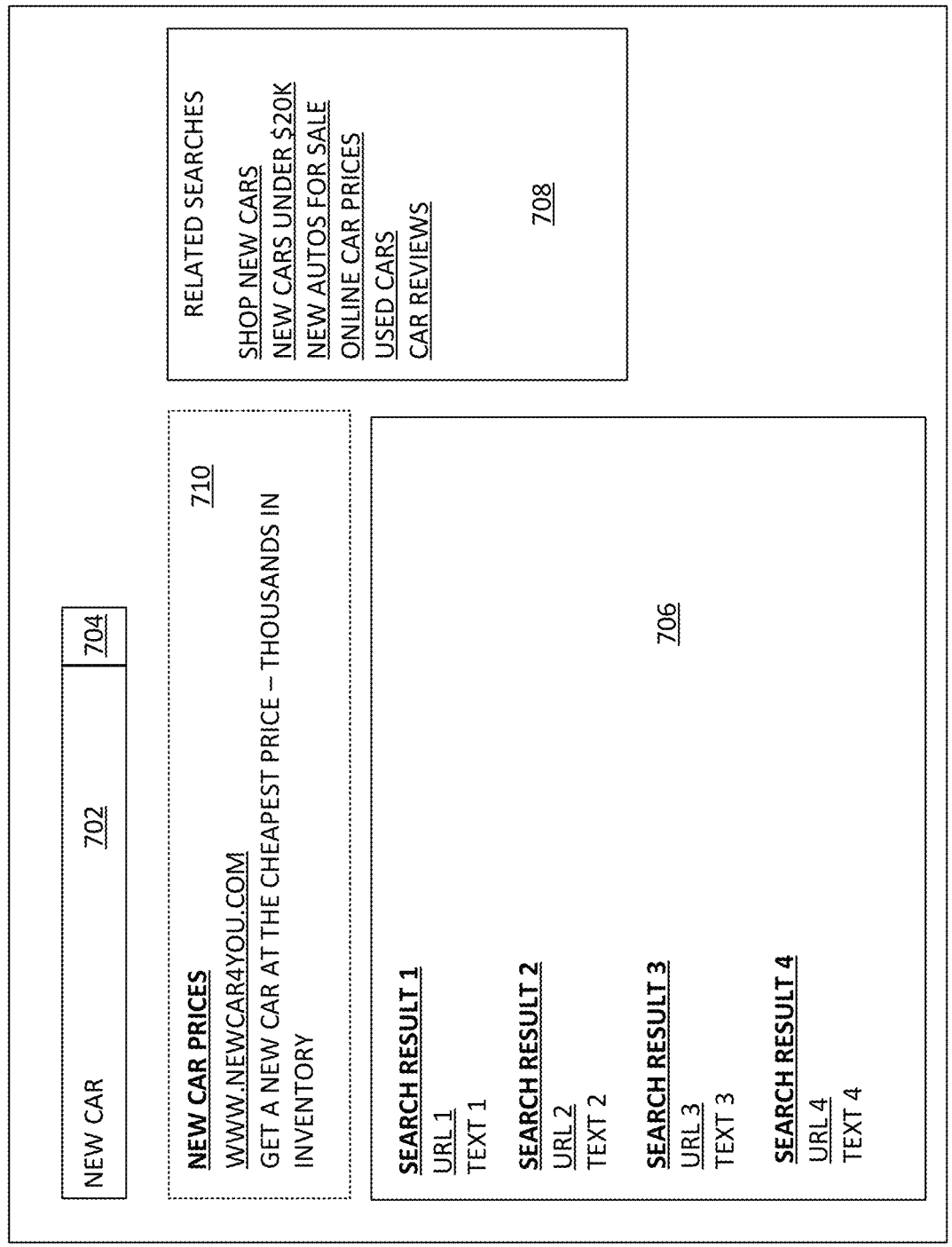
FIG. 7 depicts an exemplary search engine results page.

Now referring to FIG. 7, an exemplary SERP 700 is illustrated. The SERP 700 can include a text entry field 702 that is configured to receive a query and/or display a query that has been submitted to the search engine 612. The SERP 700 additionally includes a button 704 that can be selected by the end user 603, wherein a query included in the text entry field 702 is transmitted to the search engine 612 in response to the button 704 being selected. Upon receipt of the query, the search engine 612 performs a search based upon such query. In the exemplary SERP 700, the end user 603 has set forth the query "new car" to the search engine 612.

The SERP 700 includes a first field 706, wherein the first field 706 comprises a ranked list of search results returned by the search engine 612. Each search result in the ranked list of search results includes a title of a document (e.g., a web page) represented by the search result, a URL for the document, and text that is representative of content of the document.

The SERP 700 additionally comprises a second field 708 that includes queries related to the query set forth to the search engine 612. For instance, the query "shop new cars" is related to the query "new car" set forth to the search engine 612. The SERP 700 further comprises a third field 710 that includes a supplemental content item that is constructed by the content summarizer model 118, wherein the supplemental content item is assigned to one or more keywords in the query depicted in the text entry field 702. The supplemental content item includes a title ("New Car Prices"), a URL that points to a landing page, wherein the supplemental content item has been constructed by the content summarizer model 118 based upon the landing page (www.newcar4you.com), and a body that includes text ("Get a new car at the cheapest price—thousands in inventory"). At least one of the title or the URL can be a hyperlink that, when selected, causes a browser to load the landing page.

Figure 8:
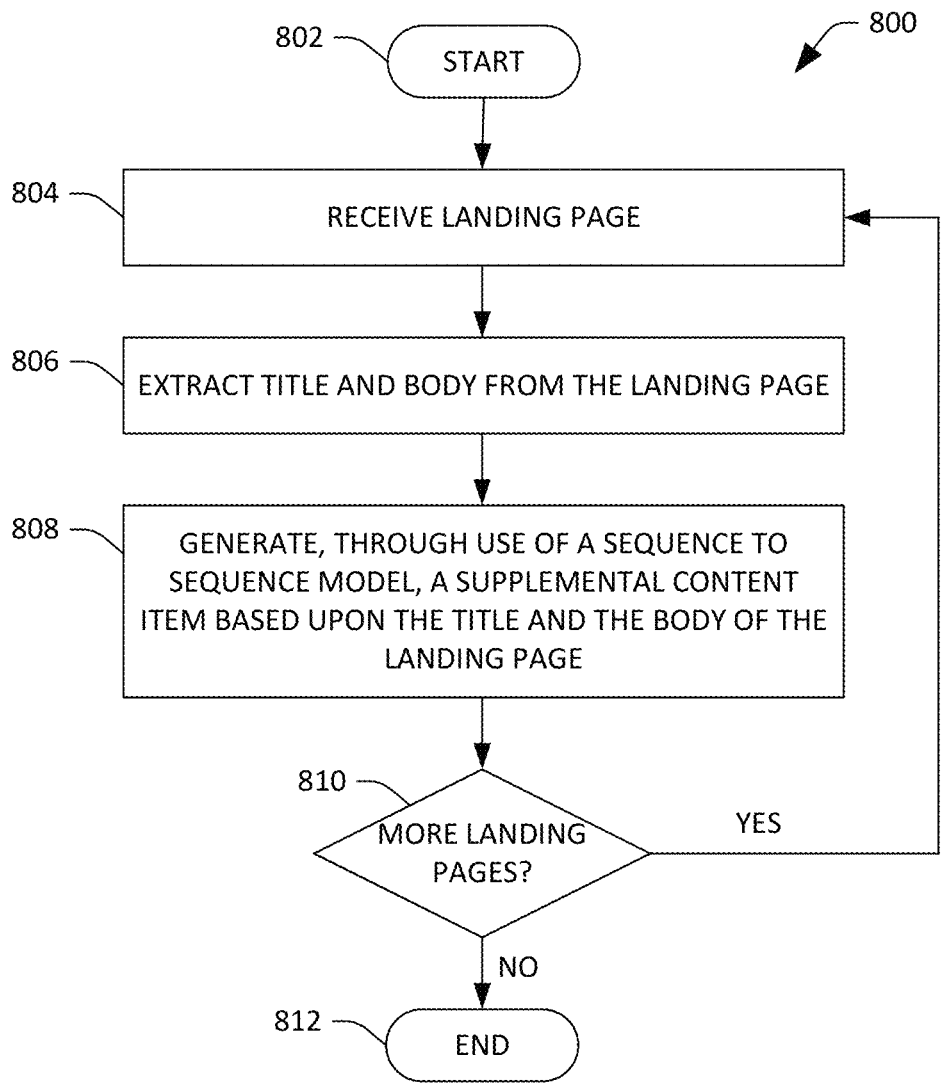
FIG. 8 is a flow diagram illustrating an exemplary methodology for generating supplemental content items.
Figure 9:
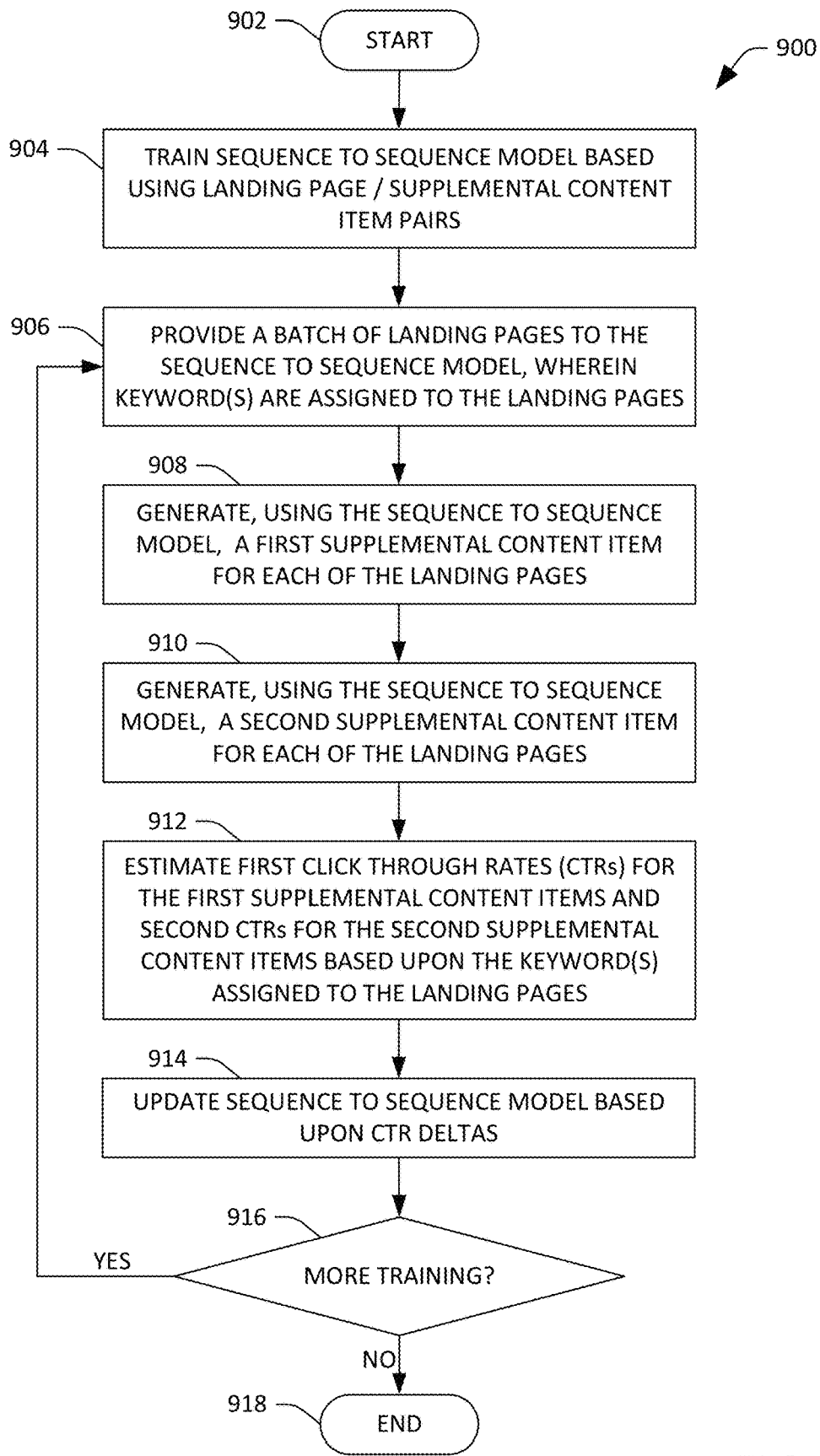
FIG. 9 is a flow diagram illustrating an exemplary methodology for training a content summarizer model.
Figure 10:
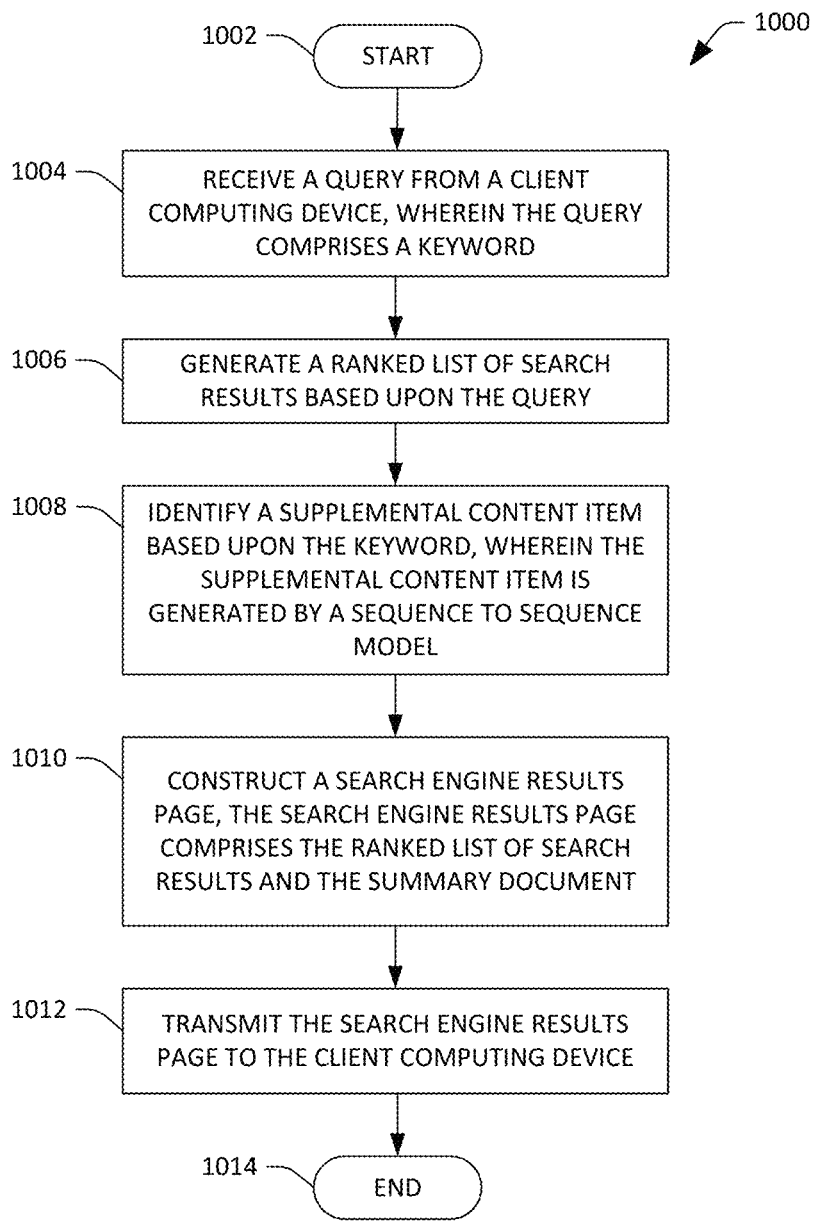
FIG. 10 is a flow diagram illustrating an exemplary methodology for including a supplemental content item in a search engine results page.

FIGS. 8-10 illustrate exemplary methodologies relating to constructing supplemental content items. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 8, a flow diagram 800 illustrating an exemplary methodology 800 for generating supplemental content items based upon corresponding landing pages is illustrated. The methodology 800 starts at 802, and at 804 a landing page is received. The landing page includes a title and a body, wherein the title of the landing page includes a first sequence of words and the body of the landing page includes a second sequence of words.

At 806, the title and the body of the landing page are extracted from the landing page (the first sequence of words and the second sequence of words are extracted from the landing page). At 808, through use of a sequence to sequence model, a supplemental content item is generated based upon the title and the body of the landing page. As described above, the sequence to sequence model is trained such that the supplemental content item has a relatively high expected CTR. More specifically, the sequence to sequence model is trained based upon expected CTRs of supplemental content items when keywords assigned to the supplemental content items are received by a search engine.

At 810, a determination is made as to whether there are additional landing pages for which supplemental content items are to be constructed. If there are additional landing pages, the methodology 800 returns to 804. If there are no additional landing pages for which supplemental content items are to be constructed, the methodology 800 completes at 812.

Now referring to FIG. 9, a flow diagram depicting an exemplary methodology 900 for training a sequence to sequence model that is to be employed in connection with constructing supplemental content items for landing pages is illustrated. The methodology 900 starts at 902, and at 904 a sequence to sequence model is trained based upon landing page/supplemental content item pairs, wherein each landing page/supplemental content item pair includes a landing page and a supplemental content item for the landing page constructed by a domain expert.

Subsequent to the sequence to sequence model being trained based upon the landing page/supplemental content item pairs, at 906 a batch of landing pages is provided to the sequence to sequence model, wherein keywords are assigned to the landing pages in the batch.

At 908, using the sequence to sequence model, first supplemental content items for landing pages in the batch are generated. For example, each first supplemental content item for each landing page can have the highest probability assigned thereto by the sequence to sequence model.

At 910 second supplemental content items for the landing pages are generated through use of the sequence to sequence model. For instance, a decoder of the sequence to sequence model can be sampled in connection with constructing the second supplemental content items, wherein the second supplemental content items have probabilities assigned thereto that is lower than the highest probabilities assigned to the first supplemental content items. More specifically, with respect to an individual landing page in the batch, the first supplemental content item output by the sequence to sequence model has the highest probability assigned thereto by the sequence to sequence model, while the second supplemental content item output by the sequence to sequence model has a probability assigned thereto by the sequence to sequence model that is lower than the highest probability. This is repeated for each landing page in the batch of landing pages.

At 912 first CTRs for the first supplemental content items and second CTRs for the second supplemental content items are estimated based upon the first and second supplemental content items and the keywords assigned to the landing pages. In the field of electronic advertising, computer-implemented algorithms exist for estimating CTRs for electronic advertisements; such an algorithm can be employed when estimating the first and second click CTRs. At 914, the sequence to sequence model is updated based upon CTR deltas (differences between the first estimated CTRs and the second estimated CTRs). For instance, if a first estimated CTR is higher than a second estimated CTR, the sequence to sequence model can be updated such that the probability that the sequence to sequence model will output the second supplemental content item when provided with the title and body of the landing page is decreased. Alternatively, if the first estimated CTR is lower than the second estimated CTR, the sequence to sequence model can be updated such that the probability that the sequence to sequence model will output the second supplemental content item when provided with the title and body of the landing page is increased.

At 916, a determination is made as to whether the sequence to sequence model is to be further trained. When the sequence to sequence model is to be further trained, the methodology 900 returns to 906. When no further training is to be undertaken, the methodology completes at 918.

Now referring to FIG. 10, a flow diagram illustrating an exemplary methodology 1000 performed by a search engine is illustrated. The methodology 1000 starts at 1002, and at 1004 a query is received from a client computing device, wherein the query comprises a keyword, and the keyword is assigned to a supplemental content item.

At 1006, the search engine generates a ranked list of search results based upon the query.

At 1008, a supplemental content item is identified based upon the keyword in the query, wherein the supplemental content item has been constructed based upon a title and text of a landing page, and further wherein the supplemental content item is generated by sequence to sequence model.

At 1010, the search engine generates a SERP, wherein the SERP includes the ranked list of search results generated at 1006 and the supplemental content item identified at 1008.

At 1012, the search engine causes the SERP to be transmitted to the client computing device, whereupon the client computing device can present the SERP on a display thereof. The methodology 1000 completes at 1014.

Figure 11:
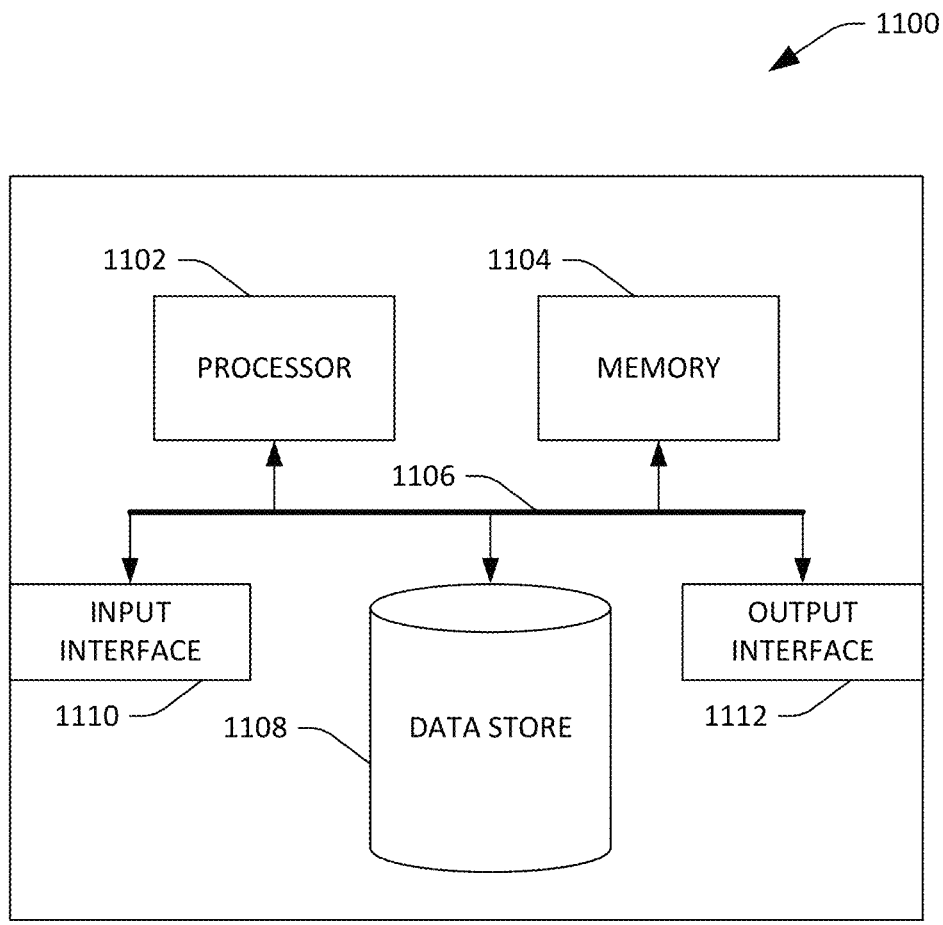
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that is configured to construct supplemental content items. By way of another example, the computing device 1100 can be used in a system that is configured to train a sequence to sequence model. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store estimated CTRs, training data, etc.

The computing device 1100 additionally includes a data store 1108 that is accessible by the processor 1102 by way of the system bus 1106. The data store 1108 may include executable instructions, supplemental content items, training data, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:
   receiving an electronic landing page, wherein the electronic landing page comprises a landing page title that includes a first sequence of words and a landing page body that includes a second sequence of words; and
   generating, through use of a computer-implemented model, a supplemental content item that summarizes the electronic landing page, wherein the supplemental content item comprises a supplemental content item title that includes a third sequence of words and a supplemental content body that includes a fourth sequence of words, wherein the computer-implemented model generates the supplemental content item based upon the first sequence of words in the landing page title and the second sequence of words in the landing page body, wherein the computer-implemented model is trained based upon estimated likelihoods of supplemental content items being selected by end users if a search engine were to receive, from the end users, queries that are assigned to the supplemental content items, and further wherein the generated supplemental content item comprises a selectable hyperlink that points to the landing page upon which the supplemental content item is based.

2. The computing system of claim 1, wherein the search engine causes the supplemental content item to be included in a search engine results page in response to receipt of a query from a client computing device, wherein the query comprises a keyword that is assigned to the supplemental content item.

3. The computing system of claim 1, wherein the computer-implemented model is a sequence to sequence model.

4. The computing system of claim 3, wherein the sequence to sequence model comprises an encoder that is configured to encode the first sequence of words and the second sequence of words in parallel, and further wherein the sequence to sequence model comprises a decoder that is configured to output the supplemental content item based upon the parallel encoding of the first sequence of words and the second sequence of words.

5. The computing system of claim 4, wherein the encoder comprises a first encoder recurrent neural network (RNN) and a second encoder RNN, and further wherein the decoder comprises a first decoder RNN and a second decoder RNN.

6. The computing system of claim 5, wherein the first encoder RNN and the second encoder RNN encode the first sequence of words and the second sequence of words, respectively, in parallel.

7. The computing system of claim 1, wherein the supplemental content item has a predefined format, wherein a number of words in the supplemental content item title is less than a first predefined threshold, and further wherein a number of words in the supplemental content body is less than a second predefined threshold that is greater than the first predefined threshold.

8. The computing system of claim 1, wherein the computer-implemented model is further trained based upon landing page/supplemental content item pairs, wherein each pair includes a respective landing page and a respective supplemental content item generated by a human to summarize the respective landing page.

9. The computing system of claim 1, the acts further comprising:
   mapping each word in the first sequence of words to a first one-hot encoded vector;
   mapping each word in the second sequence of words to a second one-hot encoded vector;
   multiplying the first one-hot encoded vector by an embedding matrix to generate a first sequence of vectors;
   multiplying the second one-hot encoded vector by the embedding matrix to generate a second sequence of vectors, wherein the computer-implemented model generates the third sequence of words and the fourth sequence of words based upon the first sequence of vectors and the second sequence of vectors.

10. A method performed by a computing system, the method comprising:
    receiving a landing page, wherein the landing page is a web page that comprises a landing page title and a landing page body, wherein the landing page title comprises a first sequence of words and the landing page body comprises a second sequence of words; and
    responsive to receiving the landing page, and through use of a computer-implemented model, constructing supplemental content item based upon the first sequence of words and the second sequence of words, wherein the supplemental content item comprises a supplemental content item title that comprises a third sequence of words and a supplemental content item body that includes a fourth sequence of words, wherein the computer-implemented model generates the third sequence of words based upon the first sequence of words and the second sequence of words, wherein the computer-implemented model generates the fourth sequence of words based upon the first sequence of words and the second sequence of words, and further wherein the constructed supplemental content item includes a selectable hyperlink that points to the landing page.

11. The method of claim 10, wherein the computer-implemented model is a sequence to sequence model, and further wherein the sequence to sequence model comprises an encoder and a decoder, wherein the encoder includes a first pair of recurrent neural networks (RNNs) and the decoder includes a second pair of RNNs.

12. The method of claim 11, wherein the first pair of RNNs and the second pair of RNNs are Long Short-Term Memory (LSTM) RNNs.

13. The method of claim 10, wherein the computer-implemented model is trained based upon estimated likelihoods of supplemental content items being selected by end users if a search engine were to receive, from the end users, queries that are assigned to the supplemental content items.

14. The method of claim 10, wherein the supplemental content item has a keyword assigned thereto, and further wherein a search engine includes the supplemental content item in a search engine results page in response to receiving a query that comprises the keyword.

15. The method of claim 10, further comprising:
mapping each word in the first sequence of words to a first one-hot encoded vector;
mapping each word in the second sequence of words to a second one-hot encoded vector;
multiplying the first one-hot encoded vector by an embedding matrix to generate a first sequence of vectors; and
multiplying the second one-hot encoded vector by the embedding matrix to generate a second sequence of vectors, wherein the computer-implemented model generates the third sequence of words and the fourth sequence of words based upon the first sequence of vectors and the second sequence of vectors.

16. A computer-readable storage medium comprising instructions that, when executed by a processor, cause the processor to perform acts comprising:

receiving a web page, wherein the web page comprises a web page title that includes a first sequence of words and a web page body that includes a second sequence of words; and generating, through use of a computer-implemented model, a supplemental content item that summarizes the web page, wherein the supplemental content item comprises a supplemental content item title that includes a third sequence of words and a supplemental content item body that includes a fourth sequence of words, wherein the computer-implemented model generates the supplemental content item based upon the first sequence of words in the web page title and the second sequence of words in the web page body, wherein the computer-implemented model is trained based upon estimated likelihoods of supplemental content items being selected by end users if a search engine were to receive, from the end users, queries that include keywords assigned to the supplemental content items, wherein the supplemental content item is presented on a search engine results page in response to the search engine receiving a query that comprises a keyword assigned to the supplemental content item, and further wherein the generated supplemental content item includes a selectable hyperlink that points to the web page.

17. The computer-readable storage medium of claim 16, wherein the computer-implemented model is a sequence to sequence model that comprises an encoder and a decoder, wherein the encoder encodes the first sequence of words and the second sequence of words in parallel.

18. The computer-readable storage medium of claim 17, wherein the encoder comprises a first RNN and a second RNN, wherein the first RNN encodes the first sequence of words and the second RNN encodes the second sequence of words.

19. The computing system of claim 1, wherein the landing page includes information about a product or service, and further wherein the supplemental content item summarizes the information about the product or service.

20. The method of claim 10, wherein the landing page includes information about a product or service that is available for purchase, and further wherein the supplemental content item summarizes the information about the product or service in the landing page.

* * * * *